Patented Feb. 4, 1936

2,029,714

UNITED STATES PATENT OFFICE 2,029,714

THIOINDIGO DYESTUFF PREPARATIONS AND A PROCESS OF PREPARING THEM

Alfred Hagenböcker and Rudolf Brune, Frankfort-on-the-Main-Hochst, Germany, assignors to General Aniline Works, Inc., New York, N. Y., a corporation of Delaware No Drawing. Application February 17, 1931, Serial No. 516,508. In Germany February 22, 1930

10 Claims. (Cl. 260—53)

The present invention relates to thioindigo dyestuff preparations and a process of preparing them.

We have found that new valuable thioindigo dyestuff preparations are obtainable by adding, in a suitable phase of the chemical process for preparing the dyestuff, for instance, during the oxidation of the hydroxythionaphthenes in an alkaline medium, to the reaction mixture of quantity of a compound of a heavy metal such as, for instance, a salt, an oxide or a hydroxide of a heavy metal, amounting to less than one molecular proportion for each molecular proportion of dyestuff to be obtained by the reaction. The metal compounds, which may be altered in the course of the manufacture, most finely disperse in the preparations and uniformly penetrate the dyestuff crystals. The addition of the heavy metal compound during the formation of the dyestuff is carried out in a suitable phase of the process so that in the course of subsequent operations, perhaps necessary for completing the formation of the dyestuff and for isolating it, the heavy metal compound is not reconverted to a water soluble compound which latter would be removed from the preparation by washing.

The dyestuff preparations thus obtainable have the following advantages over those prepared without addition of a heavy metal compound. The reduction to the leuco compound occurs much more rapidly, and the dyebaths prepared from these preparations are exhausted more quickly. Such leuco compounds which have a tendency to separate from the vats crystallize from the bath only at lower temperatures so that colder baths may be used for dyeing. When using the dyestuffs for cloth printing according to the hydrosulfide or formaldehyde-sulfoxylate process, they have a considerably greater fixing power and yield more intense tints than the dyestuffs prepared without addition of a heavy metal compound.

Our new process brings about a technical effect with all thioindigoid dyestuffs; the effect attained, however, varies within certain limits according to the reactivity, the solubility and the other properties of the dyestuffs used.

The following examples illustrate the invention, but they are not intended to limit it thereto, the parts being by weight:

(1) 30 parts of 6-ethoxy-3-hydroxythionaphthene are stirred with 600 parts of water, 1.5 parts of iron vitriol ($FeSO_4.7H_2O$) and 27 parts of sulfur. There are added 35 parts of caustic soda solution of 40° Bé. The mixture is then heated to boiling, and boiling is continued until the formation of the dyestuff is finished. The solution is then filtered by suction, and the solid matter is washed with hot water. The dyestuff thus obtained is mixed with 500 parts of water and 40 parts of sodium sulfide, while stirring, the whole is boiled, filtered by suction, and the solid matter is washed. The paste thus obtained is made up with water to the desired percentage.

(2) 30 parts of 4-methyl-6-chloro-3-hydroxythionaphthene are stirred with 600 parts of water, 1.2 parts of nickel sulfate ($NiSO_4.7H_2O$) and 27 parts of sulfur. There are added 35 parts of caustic soda solution of 40° Bé. The whole is heated to boiling, and boiling is continued until the formation of the dyestuff is finished. The solution is then filtered by suction, and the solid matter is washed with hot water. The dyestuff thus obtained is stirred with 500 parts of water and 40 parts of sodium sulfide, the whole is boiled, filtered by suction, and the solid matter is washed. The paste thus obtained is made up with water to the desired percentage.

(3) 100 parts of 4-methyl-6-chloro-3-hydroxythionaphthene are stirred with 80 parts of sulfur, 200 parts of alcohol and 1–10 parts of copper sulfate in 5–50 parts of water. The whole is then made up with water to 3000 parts and heated to 60° C. There are added 200 parts of caustic soda solution of 40° Bé. The whole is heated to boiling, and boiling is continued until the formation of the dyestuff is finished. The solution is filtered by suction, the solid matter is washed, and the press cakes are either dried or made up with water to an aqueous paste.

(4) A clear aqueous solution of an alkaline melt prepared from: 40 parts of caustic soda, 25 parts of caustic potash, 70 parts of water and 30 parts of 3-methyl-5-chloro-phenyl-1-thioglycolic acid-2-carboxylic acid amide at a temperature of 140° C.–150° C. is made up with water to 1400 parts; then there are added 0.8 part of chromium sulfate ($Cr_2(SO_4)_3 + 18H_2O$) and 30 parts of sulfur. The mixture is then heated to 90° C.–100° C., until the formation of the dyestuff is finished. The solution is filtered by suction, and the solid matter is washed with hot water. The dyestuff thus obtained is stirred with 500 parts of water and 40 parts of sodium sulfide, the whole is boiled, filtered again, and the solid matter is washed. The paste thus obtained is made up with water to the desired percentage.

(5) 1.35 parts of aluminium sulfate
($Al_2(SO_4)_3.18H_2O$)

and 30 parts of sulfur are added to the clear aqueous solution of an alkaline melt made up with water to 2000 parts and prepared from: 130 parts of caustic soda, 40 parts of caustic potash, 125 parts of water, and 34 parts of 5-ethoxy-phenyl-1-thioglycolic acid-2-carboxylic acid amide at a temperature of 140° C.–150° C. The whole is then heated to 90° C.–100° C., until the formation of the dyestuff is finished. The solution is filtered by suction, and the solid matter is washed with hot water. The dyestuff thus obtained is stirred with 500 parts of water and 40 parts of sodium sulfide, the whole is boiled, filtered again, and the solid matter is washed. The paste thus obtained is made up with water to the desired percentage.

(6) The alkali melt prepared in known manner from 100 parts of 5-ethoxy-phenyl-1-thioglycolic acid-2-carboxylic acid amide, is dissolved in 8000 parts of water, and the whole is filtered. To the solution thus clarified there is added a solution of 1–10 parts of iron vitriol in 5–50 parts of water. The strongly alkaline solution is then heated to boiling, whereby the iron vitriol is converted into ferrous hydroxide or ferrous oxide. 30 parts of sulfur are then added to the boiling solution, and the whole is boiled until the formation of the dyestuff is finished. The dyestuff thus obtained is filtered by suction, the solid matter is washed and either dried so as to form a powder or made into a paste by addition of water.

(7) 23 parts of 6-ethoxy-3-hydroxythionaphthene-2-carboxylic acid are dissolved in 120 parts of caustic soda solution of 40° Bé. and 3000 parts of water. There is added a solution of 1–10 parts of aluminium sulfate in 20 parts of water and a suspension of 19 parts of acenaphthene-quinone. The whole is heated to boiling, and boiling is continued until the formation of the dyestuff is finished. The dyestuff thus obtained is filtered by suction, the solid matter is washed and either dried so as to form a powder or made into a paste by addition of water.

We claim:

1. The process which comprises oxidizing by means of sulfur about 30 parts of 6-ethoxy-3-hydroxythionaphthene to the corresponding symmetrical thioindigo dyestuff in the presence of a caustic soda solution and about 1.5 parts of iron vitriol.

2. The process which comprises oxidizing by means of sulfur about 30 parts of 4-methyl-6-chloro-3-hydroxythionaphthene to the corresponding symmetrical thioindigo dyestuff in the presence of a caustic soda solution and about 1.2 parts of nickel sulfate.

3. The process which comprises oxidizing by means of sulfur about 100 parts of 4-methyl-6-chloro-3-hydroxythionaphthene to the corresponding symmetrical thioindigo dyestuff in the presence of a caustic soda solution and about 1 to about 10 parts of copper sulfate.

4. The dyestuff preparation substantially identical with the product obtainable by the process which comprises oxidizing by means of sulfur about 30 parts of 6-ethoxy-3-hydroxythionaphthene to the corresponding symmetrical thioindigo dyestuff in the presence of a caustic soda solution and about 1.5 parts of iron vitriol.

5. The dyestuff preparation substantially identical with the product obtainable by the process which comprises oxidizing by means of sulfur about 30 parts of 4-methyl-6-chloro-3-hydroxythionaphthene to the corresponding symmetrical thioindigo dyestuff in the presence of a caustic soda solution and about 1.2 parts of nickel sulfate.

6. The dyestuff preparation substantially identical with the product obtainable by the process which comprises oxidizing by means of sulfur about 100 parts of 4-methyl-6-chloro-3-hydroxythionaphthene to the corresponding symmetrical thioindigo dyestuff in the presence of a caustic soda solution and about 1 to about 10 parts of copper sulfate.

7. The process which comprises oxidizing in an alkaline medium a hydroxythionaphthene compound of the general formula

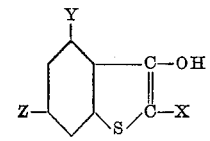

wherein X means hydrogen or carboxyl, Y hydrogen or methyl, Z chlorine or ethoxy, to the corresponding thioindigo dyestuff in the presence of a quantity of a compound of the group consisting of a salt, an oxide and a hydroxide of a metal of the group consisting of iron, nickel, copper, chromium and aluminium, amounting to less than one molecular proportion for each molecular proportion of dyestuff to be obtained by the oxidation.

8. The process which comprises oxidizing in an alkaline medium a hydroxythionaphthene compound of the general formula

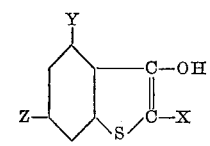

wherein X means hydrogen or carboxyl, Y hydrogen or methyl, Z chlorine or ethoxy, to the corresponding thioindigo dyestuff in the presence of a quantity of a water-soluble inorganic salt of a metal of the group consisting of iron, nickel, copper, chromium and aluminium, amounting to less than one molecular proportion for each molecular proportion of dyestuff to be obtained by the oxidation.

9. The dyestuff preparations substantially identical with the products obtainable by the process which comprises oxidizing in an alkaline medium a hydroxythionaphthene compound of the general formula

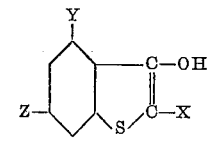

wherein X means hydrogen or carboxyl, Y hydrogen or methyl, Z chlorine or ethoxy, to the corresponding thioindigo dyestuff in the presence of a quantity of a compound of the group consisting of a salt, an oxide and a hydroxide of a metal of the group consisting of iron, nickel, copper, chromium and aluminium, amounting to less than one molecular proportion for each molecular proportion of dyestuff to be obtained by the oxidation.

10. The dyestuff preparations substantially identical with the products obtainable by the process which comprises oxidizing in an alkaline medium a hydroxythionaphthene compound of the general formula

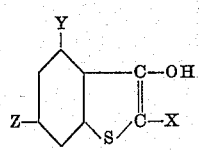

wherein X means hydrogen or carboxyl, Y hydrogen or methyl, Z chlorine or ethoxy, to the corresponding thioindigo dyestuff in the presence of a quantity of a water-soluble inorganic salt of a metal of the group consisting of iron, nickel, copper, chromium and aluminum, amounting to less than one molecular proportion for each molecular proportion of dyestuff to be obtained by the oxidation.

ALFRED HAGENBÖCKER.
RUDOLF BRUNE.